(12) United States Patent
Faunce

(10) Patent No.: US 6,664,363 B1
(45) Date of Patent: Dec. 16, 2003

(54) LOW VISCOSITY POLYESTER POLYOLS AND METHODS FOR PREPARING SAME

(75) Inventor: James A. Faunce, North Aurora, IL (US)

(73) Assignee: Stepan Company, Northfield, IL (US)

( * ) Notice: Subject to any disclaimer, the term of this patent is extended or adjusted under 35 U.S.C. 154(b) by 0 days.

(21) Appl. No.: 09/806,066

(22) PCT Filed: Feb. 23, 1999

(86) PCT No.: PCT/US99/03823
§ 371 (c)(1),
(2), (4) Date: Jan. 9, 2002

(87) PCT Pub. No.: WO99/42508
PCT Pub. Date: Aug. 26, 1999

Related U.S. Application Data

(60) Provisional application No. 60/075,657, filed on Feb. 23, 1998.

(51) Int. Cl.$^7$ .............................................. C08G 63/48
(52) U.S. Cl. .................... 528/295.5; 528/275; 528/283; 528/300; 528/302; 528/308; 528/308.6
(58) Field of Search ............................ 528/275, 295.5, 528/300, 302, 308, 308.6, 283

(56) References Cited

U.S. PATENT DOCUMENTS

| | | | |
|---|---|---|---|
| 1,922,459 A | | 8/1933 | Schmidt |
| 3,647,759 A | * | 3/1972 | Walker ........................ 528/296 |
| 4,411,949 A | * | 10/1983 | Snider et al. ............. 428/304.4 |
| 4,529,744 A | | 7/1985 | Wood |
| 4,595,711 A | | 6/1986 | Wood |
| 4,608,432 A | | 8/1986 | Magnus et al. |
| 4,644,027 A | * | 2/1987 | Magnus et al. .............. 524/375 |
| 4,644,048 A | | 2/1987 | Magnus et al. |
| 4,714,717 A | * | 12/1987 | Londrigan et al. .......... 521/131 |
| 4,812,533 A | * | 3/1989 | Simone et al. ............... 525/437 |
| 4,897,429 A | * | 1/1990 | Trowell et al. ............. 521/157 |
| 5,182,309 A | | 1/1993 | Hutzen |
| 5,451,615 A | | 9/1995 | Birch |
| 5,464,562 A | | 11/1995 | Patterson |
| 5,470,501 A | | 11/1995 | Fishback et al. |
| 5,484,817 A | | 1/1996 | Patterson |
| 5,488,071 A | | 1/1996 | Patterson |
| 5,504,125 A | | 4/1996 | Fishback et al. |
| 5,523,332 A | | 6/1996 | Fishback et al. |
| 5,632,898 A | | 5/1997 | Jung et al. |
| 5,922,779 A | | 7/1999 | Hickey |
| 6,359,022 B1 | | 3/2002 | Hickey et al. |

FOREIGN PATENT DOCUMENTS

| | | | |
|---|---|---|---|
| EP | 0 269 962 | * | 6/1988 |
| EP | 0 473 399 A2 | | 4/1992 |
| EP | 0 593 959 | * | 4/1994 |
| WO | WO 94/01479 | | 1/1994 |
| WO | WO 96/12759 | | 5/1996 |

OTHER PUBLICATIONS

International Search Report for International Application No. PCT/US99/03823, international filing date of Feb. 23, 1999.

Polyethers, Part I: Polyalkylene Oxides and Other Polyethers, N.G. Gaylord, ed, Interscience, 1963, pp. 233–37.

Nicola, et al., "Hydrocarbon Blown Foams for U.S. Construction Applications", *35th Annual Polyurethane Technical/Marketing Conference*, Oct. 9–12, 1994, pp. 412–417.

van der Wouden, et al., "The Use of Polyester Polyols in CFC–free Rigid Forms", *Utech '94*, Paper 21, pp. 1–5.

van der Wouden, "Performance of Oleochemical Based Polyester Polyols in Polyurethanes", *Utech Asia '95*, Paper 34, pp. 1–7.

Nicola, et al., "Improved Hydrocarbon Blown Foams for North America", *Polyurethane*, 1995, pp. 150–162.

Matsumoto, et al., "Development of Cyclopentane Blown Foam System for Appliances Use", *Polyurethane*, 1995, pp. 292–295.

Burkhart, et al., "Optimized Silicone Surfactants for HCFC and Pentane Blown Polyisocyanurate and Polyurethane Rigid Foams", *Polyurethane*, 1995, pp. 296–302.

Hanne, et al., "Patented, Pentane–Process Technology Key to U.S. CycloPentane–Blown Refrigerator Production", *Polyurethane*, 1995, pp. 481–483.

Chittolini, "Increasing the Solubility of Pentane in Ridig Foam Systems", *Utech '96*, Paper 56, pp. 1–6.

Ballhaus, et al., "Hydrocarbons Provide Zero ODP and Zero GWP Insulation for Household Refrigeration", *Proceedings of the Polyurethanes World Congress*, 1993, pp. 33–39.

Encyclopedia of Chemical Technology, vol. 7,pp. 257–263 published by Interscience Publishers, Inc., 1951.

Chemical Abstracts, vol. 84, No. 10, Mar. 8, 1976, abstract No. 61333, p. 103, col. 2.

* cited by examiner

*Primary Examiner*—Samuel A. Acquah
(74) *Attorney, Agent, or Firm*—McAndrews, Held & Malloy, Ltd.

(57) ABSTRACT

The present invention relates to low viscosity aromatic polyester polyols having an average functionality of two and methods for preparing such polyols. In particular, the invention relates to low viscosity aromatic polyester polyols prepared by reacting a phthalic acid based material with diethylene glycol, a higher functional polyol having an average functionality of greater than two and a long chain alkyl acid, ester or oil. The resulting aromatic polyester polyol has an average functionality of two and has a lower dynamic viscosity as compared to the esterification product of a phthalic acid based material with diethylene glycol alone.

16 Claims, No Drawings

LOW VISCOSITY POLYESTER POLYOLS AND METHODS FOR PREPARING SAME

This application claims the benefit of provisional application No. 60/075,657 filed Feb. 23, 1998.

BACKGROUND OF THE INVENTION

1. Field of the Invention

The present invention relates to low viscosity aromatic polyester polyols having an average functionality of about two and methods for preparing such polyols. In particular, the invention relates to low viscosity aromatic polyester polyols having an average functionality of about two formed by inter-esterification of a phthalic acid based material with diethylene glycol, a higher functional polyol having an average functionality of greater than two, and a long chain alkyl acid, ester or oil. The resulting aromatic polyester polyol has an average functionality of about two and has a lower dynamic viscosity as compared to the esterification product of a phthalic acid based material with diethylene glycol alone.

2. Description of the Related Art

Polyols are useful reactants in preparing a variety of polymeric or resin compositions. Aromatic polyester polyols are widely used in the manufacture of polyurethane and polyurethane-polyisocyanurate foams and resins. Typically, polyols are employed in reactions involving curing or crosslinking with polyisocyanate materials having at least two isocyanate groups per mole, reactions involving melamines or formaldehyde resins, and esterification reactions with unsaturated monobasic fatty acids to form alkyl resins.

Aromatic polyester polyols are attractive because they tend to be low in cost, yet can be used to produce a wide variety of cellular foams having excellent properties and adaptable for many end use applications. One class of aromatic polyester polyols that has enjoyed wide commercial success comprises the polyol products produced by esterification of phthalic acid or phthalic acid anhydride with an aliphatic polyhydric alcohol. For example, a diethylene glycol phthalate is available commercially from Stepan Company, Northfield, Ill. Such a polyol is a somewhat viscous liquid product, with a desirably high aromatic ring content, and a desirably low acid number. This type of polyester polyol is capable of reacting with organic isocyanates to produce, for example, coatings, adhesives, sealants, and elastomers ("CASE materials"), that can have excellent characteristics, such as tensile strength, adhesion, and abrasion resistance.

One problem generally encountered when using aromatic polyester polyols is that they are characteristically high in dynamic viscosity, making handling very difficult. Often, aromatic polyester polyols must be diluted or dissolved in relatively large amounts of a suitable solvent to enable producing low viscosity, easy-to-apply coating compositions upon being mixed with a curing or crosslinking agent.

Ideally, an aromatic polyester polyol has a dynamic viscosity that is sufficiently low to allow ease of pumping and mixing without the use of solvents or other viscosity modifying additives. An aromatic polyester polyol having too great a dynamic viscosity can cause difficulties in transfer of the material, as for example from storage to reactor or from the final product to the final application of the product. Excessive dynamic viscosity also can be a serious obstacle to efficient mixing with other CASE material ingredients, such as an isocyanate. Several solutions to this viscosity problem have been offered. See, for example, U.S. Pat. No. 4,644,027 (to Stepan Company) and U.S. Pat. No. 4,812,533 (to CasChem, Inc.), and Romanian Pat. App. 83,203. See also, for example, Liu, D. et al., Tuliao Gengye, 1988, 5, 1–3: *High Solid alkylated Resin Baked Paint* (Shenyang Inst. Chem. Co.). However, these prior art solutions are often complicated, expensive, difficult to readily implement, and may produce a polyol having a functionality of less than 2.

Thus, there is a need for low viscosity aromatic polyester polyols having an average functionality of about two that are economical to produce and can be converted into cellular foams and other CASE materials having excellent properties.

SUMMARY OF THE INVENTION

The present invention relates to a new and surprisingly useful class of low viscosity aromatic polyester polyols having an average functionality of about two, comprising the inter-esterification reaction product of at least one phthalic acid based material, at least one aliphatic diol, at least one higher functional polyol compound, and at least one hydrophobic material. The invention also relates to methods for making such aromatic polyester polyols and methods for using such aromatic polyester polyols to produce CASE materials. The invention further relates to cellular polyurethane and polyurethane/polyisocyanurate foams made using such aromatic polyester polyols. The polyester polyols of the present invention may be utilized with a wide variety of blowing agents, including water, hydrocarbon, chloroflurocarbon, and non-chlorofluorocarbon blowing agents.

The aromatic polyester polyols of the present invention can be readily blended with prior art polyols, if desired, and also with various additives conventionally used in the formulation of resin pre-polymer blends. The aromatic polyester polyols of the invention are prepared by an inter-esterification process that is simple, reliable, and well adapted for conventional chemical processing equipment.

In a first aspect, the invention provides low viscosity aromatic polyester polyols having an average functionality of about two. Thus, there is now provided an aromatic polyester polyol comprising the inter-esterification product of (a) from about 20 to about 80 mole percent of at least one phthalic acid based material selected from the group consisting of phthalic anhydride, phthalic acid, isophthalic acid, terephthalic acid, methyl esters of phthalic, isophthalic, or terephthalic acid, dimethyl terephthalate, polyethylene terephthalate, trimellitic anhydride, pyromellitic dianhydride, maleic anhydride, or mixtures thereof;

b) from about 20 to about 80 mole percent of at least one low molecular weight aliphatic diol of the formula

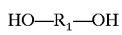

HO—$R_1$—OH wherein $R_1$ is a divalent radical selected from the group consisting of
i) alkylene radicals each containing from 2 through 12 carbon atoms;
ii) radicals of the formula —[$CH_2$—$R_2$—$CH_2$]— wherein $R_2$ is a radical selected from the group consisting of

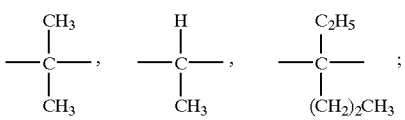

iii) radicals of the formula

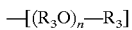

wherein $R_3$ is an alkylene radical containing from 2–4 carbon atoms and n is an integer from 1 through 10;
or mixtures thereof;

c) from about 0.1 to about 20 mole percent of a higher functional polyol of the formula

wherein $R_4$ is a divalent radical selected from the group consisting of
i) radicals of the formula $-[CH_2-R_5-CH_2]-$
wherein $R_5$ is a radical selected from the group consisting of

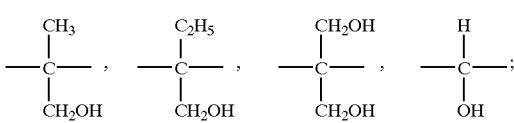

ii) radicals selected from the group consisting of glycerine, alkoxylated glycerine, sucrose, alkoxylated sucrose, methyl glucoside, alkoxylated methyl glucoside, glucose, alkoxylated glucose, fructose, alkoxylated frutose, sorbitol, alkoxylated sorbitol, lactose, and alkoxylated lactose;
or mixtures thereof; and d) from about 0.1 to about 20 mole percent of at least one hydrophobic material characterized by
i) having an equivalent weight of about 130–1000;
ii) containing from about 8 to 60 carbon atoms; and
iii) containing at least one and not more than four radicals per molecule, which are selected from the group consisting of carboxyl, hydroxyl, and mixtures thereof.

The inter-esterification reaction may be performed with or without a suitable esterification catalyst. Typically, and preferably, the inter-esterification reaction is performed with a suitable esterification catalyst known to those of ordinary skill in the art. Although the above components may be combined in any order to produce the low viscosity aromatic polyester polyols of the invention, in a somewhat preferred embodiment, components (a), (b), and (c) initially are combined and the inter-esterification is allowed to proceed to substantial completion, forming an intermediate polyester polyol which is then inter-esterified with component (d) to form the low viscosity aromatic polyester polyol of the present invention.

Generally, the inter-esterification reactions of the present invention are carried out under vacuum conditions, at temperatures sufficient to effect the desired esterification reaction, and water is removed from the reaction contents as the esterification proceeds. Typically, the esterification reaction is performed at a temperature of about 100° C. to about 300° C. More preferably, the esterification is performed at a temperature of about 180° C. to about 220° C.

In another aspect, the invention provides a process for producing low viscosity aromatic polyester polyols having a functionality of about two. Accordingly, there is now provided a process for producing low viscosity aromatic polyester polyols comprising inter-esterifying in any order (a) from about 20 to about 80 mole percent of at least one phthalic acid based material selected from the group consisting of phthalic anhydride, phthalic acid, isophthalic acid, terephthalic acid, methyl esters of phthalic, isophthalic, or terephthalic acid, dimethyl terephthalate, polyethylene terephthalate, trimellitic anhydride, pyromellitic dianhydride, maleic anhydride, or mixtures thereof;

b) from about 20 to about 80 mole percent of at least one low molecular weight aliphatic diol of the formula

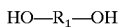

wherein $R_1$ is a divalent radical selected from the group consisting of
i) alkylene radicals each containing from 2 through 12 carbon atoms;
ii) radicals of the formula $-[CH_2-R_2-CH_2]-$
wherein $R_2$ is a radical selected from the group consisting of

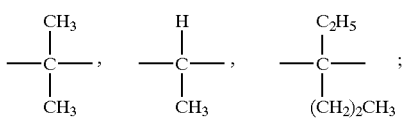

iii) radicals of the formula

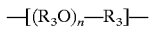

wherein $R_3$ is an alkylene radical containing from 2–4 carbon atoms and n is an integer from 1 through 10;
or mixtures thereof;

c) from about 0.1 to about 20 mole percent of a higher functional polyol of the formula

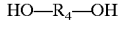

wherein $R_4$ is a divalent radical selected from the group consisting of
i) radicals of the formula $-[CH_2-R_5-CH_2]-$
wherein $R_5$ is a radical selected from the group consisting of

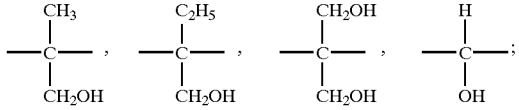

ii) radicals selected from the group consisting of glycerine, alkoxylated glycerine, sucrose, alkoxylated sucrose, methyl glucoside, alkoxylated methyl glucoside, glucose, alkoxylated glucose, fructose, alkoxylated frutose, sorbitol, alkoxylated sorbitol, lactose, and alkoxylated lactose;
or mixtures thereof; and d) from about 0.1 to about 20 mole percent of at least one hydrophobic material characterized by
i) having an equivalent weight of about 130–1000;
ii) containing from about 8 to 60 carbon atoms; and
iii) containing at least one and not more than four radicals per molecule, which are selected from the group consisting of carboxyl, hydroxyl, and mixtures thereof.

The inter-esterification reaction may be preformed with or without a suitable esterification catalyst. Typically, and preferably, the inter-esterification reaction is performed with a suitable esterification catalyst known to those of ordinary skill in the art. Although the above components may be combined in any order in accordance with the process of the present invention, in a somewhat preferred embodiment, components (a), (b), and (c) initially are combined in any order and the inter-esterification is allowed to proceed to substantial completion, forming an intermediate polyester polyol product which is then inter-esterified with component (d) to form the low viscosity aromatic polyester polyol of the present invention.

In a further aspect, the invention provides low viscosity aromatic polyester polyols having an average functionality of about two that can be mixed with polyisocyanates to yield polyurethane compositions useful as coatings, adhesives, sealants, elastomers, (CASE materials), and as potting or molding compounds.

In a still further aspect, the invention provides low viscosity aromatic polyester polyols having an average functionality of about two and having improved solubility in polyether polyols and isocyanates as compared to standard polyols such as the esterification product of phthalic anhydride and diethylene glycol alone.

DETAILED DESCRIPTION OF THE INVENTION

As used herein, the term "polyester polyol" means a polyol having ester linkages. An aromatic polyester polyol of the invention includes any minor amounts of unreacted polyol remaining after the preparation of the polyester polyol and/or any minor amounts of unesterified low molecular weight polyols (e.g., diol) added after the preparation of the polyester polyol. Although not highly preferred, the aromatic polyester polyol can include up to about 40 weight percent free diol.

The aromatic polyester polyols advantageously have an average functionality of about two. The average hydroxyl number values of the aromatic polyester polyols of the invention generally fall within a range of about 20 to about 400, preferably about 28 to about 300 and more preferably about 56 to about 225 (taking into account the free glycols that may be present). The free glycol content of the aromatic polyester polyols of the invention generally is from about 0 to about 20 weight percent, and usually from 1 to about 15 weight percent, based on the total weight of polyester polyol component.

Typically, the dynamic viscosity of the aromatic polyester polyols of the invention ranges from about 500 to about 50,000 centipoise (cps) at 25° C. In a more preferred embodiment, the dynamic viscosity of the aromatic polyester polyols of the invention will range from about 1000 to about 10,000 cps at 25° C.

It is possible, though less desirable, that the aromatic polyester polyols of the invention may contain small amounts of residual, non-inter-esterified phthalic acid based materials, aliphatic diols, higher functional polyols, and/or hydrophobic materials. Typically, these non-inter-esterified materials will be present in an amount of less than about 20 percent by weight, based on the total weight of the components combined to form the aromatic polyester polyols of the invention.

Phthalic Acid Based Material

The polyester polyols can be prepared using a phthalic acid based material derived (a) from substantially pure sources of the phthalic acid residues, such as phthalic anhydride, phthalic acid, isophthalic acid, terephthalic acid, methyl esters of phthalic, isophthalic, or terephthalic acid, dimethyl terephthalate, polyethylene terephthalate, trimellitic anhydride, pyromellitic dianhydride, maleic anhydride, or mixtures thereof; or (b) from more complex ingredients such as the side stream, waste or scrap residues from the manufacture of phthalic acid, terephthalic acid, dimethyl terephthalate, polyethylene terephthalate, and the like. Especially suitable compositions containing phthalic acid residues for use in the invention are (a) ester-containing byproducts from the manufacture of dimethyl terephthalate, (b) scrap polyalkylene terephthalates, (c) phthalic anhydride, (d) residues from the manufacture of phthalic acid or phthalic anhydride, (e) terephthalic acid, (f) residues from the manufacture of terephthalic acid, (g) isophthalic acid, (h) trimellitic anhydride; or combinations thereof.

The phthalic acid based material advantageously comprises at least about 30 percent by weight of phthalic acid residues. By phthalic acid residue is meant the group:

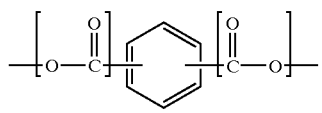

Preferred phthalic acid based materials are selected from the group consisting of phthalic anhydride, phthalic acid, isophthalic acid, terephthalic acid, methyl esters of phthalic, isophthalic, or terephthalic acid, dimethyl terephthalate, polyethylene terephthalate, trimellitic anhydride, pyromellitic dianhydride, maleic anhydride, or mixtures thereof. Less preferably, the phthalic acid based material may be derived from a phthalic anhydride bottoms composition, a phthalic anhydride crude composition, or a phthalic anhydride light ends composition, as such compositions are defined in U.S. Pat. No. 4,529,744, the entirety of which is incorporated herein by reference.

Other useful phthalic acid based materials include, for example, polyalkylene terephthalates, especially polyethylene terephthalate (PET), or PET residues or scraps.

Still other useful phthalic acid based materials include DMT process residues, which are waste or scrap residues from the manufacture of dimethyl terephthalate (DMT). The term "DMT process residue" refers to the purged residue which is obtained during the manufacture of DMT in which p-xylene is converted through oxidation and esterification with methanol to the desired product in a reaction mixture along with a complex mixture of byproducts. The desired DMT and the volatile methyl p-toluate byproduct are removed from the reaction mixture by distillation leaving a residue. The DMT and methyl p-toluate are separated, the DMT is recovered and methyl p-toluate is recycled for oxidation. The residue that remains can be directly purged from the process or a portion of the residue can be recycled for oxidation and the remainder diverted from the process or, if desired, the residue can be processed further as, for example, by distillation, heat treatment and/or methanolysis to recover useful constituents which might otherwise be lost, prior to purging the residue from the system. The residue which is finally purged from the process, either with or without additional processing, is herein called DMT process residue.

These DMT process residues may contain DMT, substituted benzenes, polycarbomethoxy diphenyls, benzyl esters of the toluate family, dicarbomethoxy fluorenone, carbomethoxy benzocoumarins and carbomethoxy polyphenols. Cape Industries, Inc. sells DMT process residues under the trademark Terate® 101. DMT process residues having a different composition but still containing the aromatic esters and acids are also sold by DuPont and others. The DMT process residues to be transesterified in accordance with the present invention preferably have a functionality at least slightly greater than 2. Such suitable phthalic acid based material residues include those disclosed in U.S. Pat. Nos. 3,647,759; 4,411,949; 4,714,717; and 4,897,429; the disclosures of each of which with respect to the residues are hereby incorporated by reference.

Aliphatic Diols

The low molecular weight aliphatic diols useful in the present invention are of the formula

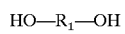

wherein $R_1$ is a divalent radical selected from the group consisting of i) alkylene radicals each containing from 2 through 12 carbon atoms;

ii) radicals of the formula —[CH$_2$—R$_2$—CH$_2$]— wherein $R_2$ is a radical selected from the group consisting of

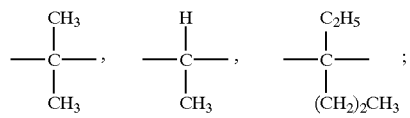

iii) radicals of the formula

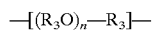

wherein $R_3$ is an alkylene radical containing from 2–4 carbon atoms and n is an integer from 1 through 10;

or mixtures thereof

Examples of suitable aliphatic diols include ethylene glycol, diethylene glycol, propylene glycol, dipropylene glycol, trimethylene glycol, butylene glycols, 1,4 butanediol, 1,6-hexanediol, 1,2-cyclohexanediol, poly (oxyalkylene)polyols containing from two to four alkylene radicals derived by the condensation of ethylene oxide, propylene oxide, or any combination thereof, and the like. As those skilled in the art will appreciate, in the preparation of mixed poly(oxyethylene-oxypropylene)polyols, the ethylene and propylene oxides may be added to a starting hydroxyl-containing reactant either in admixture or sequentially. Mixtures of such diols can be employed, if desired. Preferred aliphatic diols are neopentyl glycol and diethylene glycol.

Higher Functional Polyols

The higher functional polyols useful in the present invention are of the formula

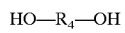

wherein $R_4$ is a divalent radical selected from the group consisting of i) radicals of the formula —[CH$_2$—R$_5$—CH$_2$]— wherein $R_5$ is a radical selected from the group consisting of

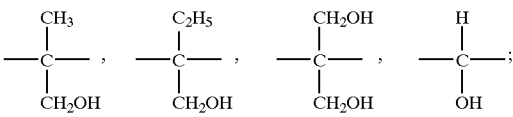

ii) radicals selected from the group consisting of glycerine, alkoxylated glycerine, sucrose, alkoxylated sucrose, methyl glucoside, alkoxylated methyl glucoside, glucose, alkoxylated glucose, fructose, alkoxylated fructose, sorbitol, alkoxylated sorbitol, lactose, and alkoxylated lactose;

or mixtures thereof.

Other examples of useful higher functional polyols include pentaerythritol and trimethylol propane.

Hydrophobic Materials

The term "hydrophobic material" as used herein means one or more substantially water insoluble compounds containing a substantially nonpolar organic moiety and at least one active hydrogen group, such as a hydroxyl group, a carboxylic acid group or carboxylic acid ester group.

Any hydrophobic material as above characterized can be employed, such as carboxylic acids (especially fatty acids), lower alkanol esters of carboxylic acids (especially fatty acid methyl esters), triglycerides (especially fats and oils), and the like. Mixtures of different hydrophobic materials can be employed if desired.

Preferred hydrophobic materials generally are characterized by i) having an equivalent weight of about 130–1000;

ii) containing from about 8 to 60 carbon atoms; and iii) containing at least one and not more than four radicals per molecule, where the radicals are selected from the group consisting of carboxyl, hydroxyl, and mixtures thereof.

Examples of fatty acids include caproic, caprylic, capric, lauric, myristic, palmitic, stearic, oleic, linoleic, linolenic, mixtures thereof, and the like. Examples of fatty acid methyl esters include methyl caproate, methyl caprylate, methyl caprate, methyl laurate, methyl myristate, methyl palmitate, methyl oleate, methyl stearate, methyl linoleate, methyl linolenate, mixtures thereof and the like.

Examples of commercially available, relatively low cost fats and oils include castor oil, coconut (including cochin) oil, corn oil, cottonseed oil, linseed oil, olive oil, palm oil, palm kernel oil, peanut oil, soybean oil, sunflower oil, tall oils, tallow, or mixtures thereof. Other suitable hydrophobic materials include dimer acid and 2-ethylhexanoic acid.

Presently preferred types of hydrophobic materials include alkyl alcohols, lower alkyl esters of fatty acids, fats, and oils. A particularly prefferred hydrophobic material is soybean oil.

Inter-esterification Catalysts

As previously indicated, the inter-esterification reaction is preferably performed using any suitable esterification catalyst known to those of ordinary skill in the art. Typically, the catalyst is present from about 0.001 to about 0.1 percent by weight, based on the total weight of all reactants. Suitable inter-esterification catalysts include, for example, acids such as sulfuric acid, phosphoric acid, para-toluene sulfonic acid; organotin compounds such dibutyl tin-(IV) dilaurate; and titanium compounds such as titanium (IV) isoproxide. Dibutyl-tin-dilaurate and titantium (IV) isopoxoxide are the preferred catalysts.

Optional Polyols

Although neither required nor necessarily preferred, polyester polyols of the present invention may be combined with other known polyols to produce polyol blends. Examples of optional polyols are thioether polyols, polyester amides and polyacetals containing hydroxyl groups, aliphatic polycarbonates containing hydroxyl groups, amine terminated polyoxyalkylene polyethers, and preferably, polyester polyols, polyester polyether polyols, polyoxyalkylene polyether polyols, and graft dispersion polyols. Mixtures of at least two of the aforesaid polyols can be used as long as the combination has an average hydroxyl number in the aforesaid range.

Optional polyoxyalkylene polyether polyols, which can be obtained by known methods, can be mixed with the polyester polyols of the present invention. For example, polyether polyols can be produced by anionic polymerization with alkali hydroxides such as sodium hydroxide or potassium hydroxide or alkali alcoholates, such as sodium methylate, sodium ethylate, or potassium ethylate or potassium isopropylate as catalysts and with the addition of at least one initiator molecule containing 2 to 8, preferably 3 to 8, reactive hydrogens or by cationic polymerization with Lewis acids such as antimony pentachloride, boron trifluoride etherate, etc., or bleaching earth as catalysts from one or more alkylene oxides with preferably 2 to 4 carbons in the alkylene radical. Any suitable alkylene oxide may be used such as 1,3-propylene oxide, 1,2- and 2,3-butylene oxide, amylene oxides, styrene oxide, and preferably ethylene oxide and 1,2-propylene oxide and mixtures of these oxides. The optional polyoxyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide. The optional polyalkylene polyether polyols may have either primary or secondary hydroxyl groups.

Included among the optional polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, poly-1,4-tetramethylene and polyoxyethylene glycols, and copolymer glycols prepared from blends or sequential addition of two or more alkylene oxides. The optional polyalkylene polyether polyols may be prepared by any known process such as, for example, the process disclosed by Wurtz in 1859 and Encyclopedia of Chemical Technology, Vol. 7, pp. 257–262, published by Interscience Publishers, Inc. (1951) or in U.S. Pat. No. 1,922,459.

Preferred optional polyethers include the alkylene oxide addition products of polyhydric alcohols such as ethylene glycol, propylene glycol, dipropylene glycol, trimethylene glycol, 1,2-butanediol, 1,5-pentanediol, 1,6-hexanediol, 1,7-heptanediol, hydroquinone, resorcinol, glycerol, 1,1,1-trimethylol-propane, 1,1,1-trimethylolethane, pentaerythritol, 1,2,6-hexanetriol, alpha-methyl glucoside, sucrose, and sorbitol. Preferred optional polyethers also include the alkylene oxide addition products of polyhydric alcohol compounds derived from phenol, such as 2,2-bis(4-hydroxyphenyl)-propane, commonly known as Bisphenol A.

All documents, e.g., patents and journal articles, cited above or below are hereby incorporated by reference in their entirety. In the following examples, all amounts are stated in percent by weight of active material unless indicated otherwise. One skilled in the art will recognize that modifications may be made in the present invention without deviating from the spirit or scope of the invention. The invention is illustrated further by the following examples which are not to be construed as limiting the invention or scope of the specific procedures or compositions described. The examples of this application disclose the reactants and their compositions along with the temperatures and reaction times which are advantageous for polyols prepared from specific components or reactants. For other reactants, these variables may be slightly different, but are easily ascertainable by those skilled in the art by routine experimentation.

The following definitions are offered for materials described herein and used in the following examples:

| | |
|---|---|
| PA | Phthalic anhydride; commercially available from Stepan Company, Northfield, Illinois |
| DEG | Diethylene glycol |
| Voranol 270 | Propoxylated glycerin; commercially available from Dow Chemical |
| TBT | Titanium (IV) butoxide |
| SBO | Soybean oil |
| C-68 Methyl ester | Methyl ester of C16–18 fatty acid; commercially available from Stepan Company, Northfield, Illinois |
| PS-2002 | PA/DEG polyester polyol with 200 OHV; commercially available from Stepan Company, Northfield, Illinois |

The acid values (AV) of the various examples are a measurement of residual acid in the final polyester polyol product. The AV values were determined by standard titration techniques. The hydroxyl value (OHV) of the various examples are a measure of the number of OH groups. The OHV values were determined by standard titration techniques. Dynamic viscosity measurement were performed using a Brookfield Viscometer. Percent water measurements were obtained by Karl-Fischer titration.

EXAMPLE 1

A 5-L flask was charged with 1460 of PA and 1620 g of DEG. Under a 5 mm flow of nitrogen, the reaction was heated to 200 C. At 150 C. a 5 in. vacuum was applied while still under nitrogen. T=0 was when condensation began. The following times were used for vacuum system increases: 1.5 hrs. at 5 inches, 1.5 hours at 20 in., and 5 hours at 25 in. After 8 hours total, the AV=30 and 564 g of Voranol were added along with 144 g DEG (OHV=182, corrected—adjusted to 225 by adding 144 g DEG). The reaction was heated to 200 C. under 25 in. vacuum and once temperature was reached, 0.5 g TBT added (125 ppm based on final polyester polyol charge). After 3 hours, the AV=7.6 and an additional 0.5 g TBT added. After an additional 2.5 hrs, the AV=0.80. An OHV was run and found to be 196 (added 84 g of DEG). 356 g of SBO were added and stirred for 2 hours at 200 C. Reaction was clear in 2–3 hours at room temperature. (Total reaction time=15–16 hours).

| | |
|---|---|
| OHV | 199 |
| AV | 0.43 |
| Visc | 3700 cps @ 25 C. (Visc of 200 OHV PA/DEG = 25000 cps @ 25 C.) |
| Water | 0.02% |

EXAMPLE 2

A 5-L flask was charged with 1292 g of PA and 1063 g of DEG. Under a flow of nitrogen, the reaction was heated to 200 C. At 150 C. a 5 in. vacuum was applied while still under nitrogen. T=0 was when condensation began. The following times were used for vacuum system increases: 1.5 hrs. at 5 inches, 1.5 hours at 20 in., and 5 hours at 25 in. After 8 hours total, the AV=35 and 942 g of Voranol were added. The reaction was heated to 200 C. under 25 in. vacuum and once temperature was reached, 0.5 g TBT added (125 ppm based on final polyester polyol charge). After 2 hours, the AV=16 and an additional 0.5 g TBT added. After an additional 3 hrs, the AV=5.7. An OHV was run and found to be 120 (no adjustments made). A final shot of catalyst was added and after 2 hours the AV=0.77. The vacuum was taken off the reactor and left under nitrogen. 591 g of SBO followed by 71 g of DEG were added to the reactor with stirring. After 5–6 hours the product was clear at room temperature with the following statistics (20–21 hours reaction time):

| | |
|---|---|
| OHV | 113 |
| AV | 0.42 |
| Visc | 8300 cps @ 25 C. (Visc. of 110 PA/DEG > 100M cps @ 25 C.) |
| Water | 0.03% |

EXAMPLE 3

Prepared as in Example 2 except that 391 g of C-68 Methyl Ester was used instead of Soybean Oil. Condensation was seen as an indication of MeOH removal and reaction completion. Final Analysis was:

| | |
|---|---|
| OHV | 113 |
| AV | 1.0 |
| Dynamic viscosity | 8400 cps @ RT |

EXAMPLE 4

Initial work was done on the low viscosity polyester polyols by adding pentaerythritol to PS-2002, and then adding soybean oil. The reaction was run using 83% PS-2002, 2.2% pentaerythritol (to give a 2.2 functional polyester polyol), and 14.6% Soybean Oil (SBO). In this reaction scheme, a 1:1 molar ratio of pentaerythritol:SBO gives a two functional product. A 200 OHV PA/DEG polyester polyol was heated to 215 C. and the pentaerythritol and SBO added along with 200 ppm TBT. It took 14 hours for the product to be clear at room temperature, but at the end the OHV=215 and the dynamic viscosity was 7500 cps at 25° C.

From the foregoing, it will be appreciated that although specific embodiments of the invention have been described herein for purposes of illustration, various modifications may be made without deviating from the spirit or scope of the invention.

What is claimed is:

1. A low viscosity aromatic polyester polyol comprising the inter-esterification product of
   (a) from about 20 to about 80 mole percent of at least one phthalic acid based material selected from the group consisting of phthalic anhydride, phthalic acid, isophthalic acid, terephthalic acid, methyl esters of phthalic, isophthalic, or terephthalic acid, dimethyl terephthalate, polyethylene terephthalate, trimellitic anhydride, pyromellitic dianhydride, maleic anhydride, and mixtures thereof;
   (b) from about 20 to about 80 mole percent of at least one low molecular weight aliphatic diol of the formula

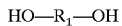

wherein $R_1$ is a divalent radical selected from the group consisting of
   (i) alkylene radicals each containing from 2 through 12 carbon atoms;
   (ii) radicals of the formula —[$CH_2$—$R_2$—$CH_2$]— wherein $R_2$ is a radical selected from the group consisting of

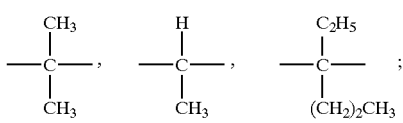

(iii) radicals of the formula

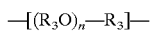

wherein $R_3$ is an alkylene radical containing from 2–4 carbon atoms and n is an integer from 1 through 10; and mixtures thereof;
   (c) from about 0.1 to about 20 mole percent of a higher functional polyol selected from the group consisting of alkoxylated glycerine, sucrose, alkoxylated sucrose, methyl glucoside, alkoxylated methyl glucoside, glucose, alkoxylated glucose, fructose, alkoxylated fructose, alkoxylated sorbitol, lactose, alkoxylated lactose, and mixtures thereof; and
   (d) from about 0.1 to about 20 mole percent of at least one hydrophobic material characterized by
   (i) having an equivalent weight of about 130–1000;
   (ii) containing from about 8 to 60 carbon atoms; and
   (iii) containing at least one and not more than four radicals per molecule, which are selected from the group consisting of carboxyl, hydroxyl, and mixtures thereof;
   wherein the aromatic polyester polyol has an average functionality of about two.

2. A low viscosity aromatic polyester polyol according to claim 1, comprising the inter-esterification product of from about 25 to about 70 mole percent phthalic acid based material, from about 25 to about 70 mole percent aliphatic diol, from about 0.1 to about 15 mole percent higher functional polyol, and from about 0.1–15 mole percent hydrophobic material.

3. A low viscosity aromatic polyester polyol according to claim 2, comprising the inter-esterification product of from about 30 to about 60 mole percent phthalic acid based material, from about 30 to about 60 mole percent aliphatic diol, from about 0.1 to about 10 mole percent higher functional polyol, and from about 0.1–10 mole percent hydrophobic material.

4. A low viscosity aromatic polyester polyol according to claim 1, wherein the phthalic acid based material is phthalic anhydride, the aliphatic diol is diethylene glycol, the higher functional polyol is selected from the group consisting of alkoxylated glycerine, sucrose, alkoxylated sucrose, methyl glucoside, alkoxylated methyl glucoside, glucose, alkoxylated glucose, fructose, alkoxylated frutose, alkoxylated sorbitol, lactose, alkoxylated lactose, and mixtures thereof;
and the hydrophobic material is soybean oil.

5. A low viscosity aromatic polyester polyol according to claim 1, wherein the low viscosity polyester polyol has a dynamic viscosity of from about 100 to about 50,000 cP at 25° C.

6. A low viscosity aromatic polyester polyol according to claim 5, wherein the low viscosity aromatic polyester polyol has a dynamic viscosity of from about 1,000 to about 10,000 cP at 25° C.

7. A low viscosity aromatic polyester polyol comprising the inter-esterification product of
   (a) from about 20 to about 80 mole percent of at least one phthalic acid based material selected from the group consisting of phthalic anhydride, phthalic acid, isophthalic acid, terephthalic acid, methyl esters of phthalic, isophthalic, or terephthalic acid, dimethyl terephthalate, polyethylene terephthalate, trimellitic anhydride, pyromellitic dianhydride, maleic anhydride, and mixtures thereof;
   (b) from about 20 to about 80 mole percent of at least one low molecular weight aliphatic diol of the formula

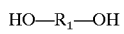

wherein $R_1$ is a divalent radical selected from the group consisting of
   (i) alkylene radicals each containing from 2 through 12 carbon atoms;
   (ii) radicals of the formula $-[CH_2-R_2-CH_2]-$ wherein $R_2$ is a radical selected from the group consisting of

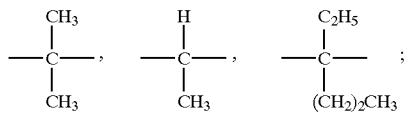

(iii) radicals of the formula

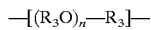

wherein $R_3$ is an alkylene radical containing from 2–4 carbon atoms and n is an integer from 1 through 10; and mixtures thereof;
   (c) from about 0.1 to about 20 mole percent of a higher functional polyol selected from the group consisting of
      alkoxylated glycerine, sucrose, alkoxylated sucrose, methyl glucoside, alkoxylated methyl glucoside, glucose, alkoxylated glucose, fructose, alkoxylated fructose, alkoxylated sorbitol, lactose, alkoxylated lactose, and mixtures thereof;
   wherein (a), (b), and (c) are interesterified to form an intermediate polyester polyol, which is further esterified with
   (d) from about 0.1 to about 20 mole percent of at least one hydrophobic material characterized by
      (i) having an equivalent weight of about 130–1000;
      (ii) containing from about 8 to 60 carbon atoms; and
      (iii) containing at least one and not more than four radicals per molecule, which are selected from the group consisting of carboxyl, hydroxyl, and mixtures thereof;
   wherein the aromatic polyester polyol has an average functionality of about two.

8. A low viscosity aromatic polyester polyol according to claim 7, comprising the inter-esterification product of from about 25 to about 70 mole percent of phthalic acid based material, from about 25 to about 70 mole percent of aliphatic diol, from about 0.1 to about 15 mole percent of higher functional polyol, and from about 0.1 to about 15 mole percent of hydrophobic material.

9. A low viscosity aromatic polyester polyol according to claim 8, comprising the inter-esterification product of from about 30 to about 60 mole percent of phthalic acid based material, from about 30 to about 60 mole percent of aliphatic diol, from about 0.1 to about 10 mole percent of higher functional polyol, and from about 0.1 to about 10 mole percent of hydrophobic material.

10. A low viscosity aromatic polyester polyol according to claim 7, wherein the phthalic acid based material is phthalic anhydride, the aliphatic diol is diethylene glycol, the higher functional polyol is selected from the group consisting of
   alkoxylated glycerine, sucrose, alkoxylated sucrose, methyl glucoside, alkoxylated methyl glucoside, glucose, alkoxylated glucose, fructose, alkoxylated frutose, alkoxylated sorbitol, lactose, alkoxylated lactose, and mixtures thereof;
   and the hydrophobic material is soybean oil.

11. A low viscosity aromatic polyester polyol according to claim 7, wherein the low viscosity polyester polyol has a dynamic viscosity of from about 100 to about 50,000 cP at 25° C.

12. A low viscosity aromatic polyester polyol according to claim 11, wherein the low viscosity aromatic polyester polyol has a dynamic viscosity of from about 1,000 to about 10,000 cP at 25° C.

13. A process for producing a low viscosity aromatic polyester polyol having an average functionality of about two, comprising inter-esterifying in any order
   (a) from about 20 to about 80 mole percent of at least one phthalic acid based material selected from the group consisting of phthalic anhydride, phthalic acid, isophthalic acid, terephthalic acid, methyl esters of phthalic, isophthalic, or terephthalic acid, dimethyl terephthalate, polyethylene terephthalate, trimellitic anhydride, pyromellitic dianhydride, maleic anhydride, and mixtures thereof;
   (b) from about 20 to about 80 mole percent of at least one low molecular weight aliphatic diol of the formula

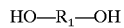

wherein $R_1$ is a divalent radical selected from the group consisting of
   (i) alkylene radicals each containing from 2 through 12 carbon atoms;
   (ii) radicals of the formula $-[CH_2-R_2-CH_2]-$ wherein $R_2$ is a radical selected from the group consisting of

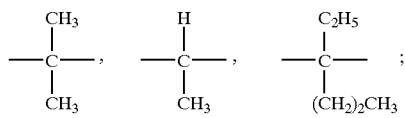

(iii) radicals of the formula

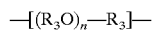

wherein $R_3$ is an alkylene radical containing from 2–4 carbon atoms and n is an integer from 1 through 10; and or mixtures thereof;
   (c) from about 0.1 to about 20 mole percent of a higher functional polyol selected from the group consisting of alkoxylated glycerine, sucrose, alkoxylated sucrose, methyl glucoside, alkoxylated methyl glucoside, glucose, alkoxylated glucose, fructose, alkoxylated fructose, aorbitol, alkoxylated sorbitol, lactose, and alkoxylated lactose, and mixtures thereof; and (d) from about 0.1 to about 20 mole percent of at least one hydrophobic material characterized by
  (i) having an equivalent weight of about 130–1000;
  (ii) containing from about 8 to 60 carbon atoms; and
  (iii) containing at least one and not more than four radicals per molecule, which are selected from the group consisting of carboxyl, hydroxyl, and mixtures thereof.

14. A process according to claim 13, wherein inter-esterification occurs in the presence of an esterification catalyst.

15. A process for producing a low viscosity aromatic polyester polyol having an average functionality of about two, comprising inter-esterifying in any order (a) from about 20 to about 80 mole percent of at least one phthalic acid based material selected from the group consisting of phthalic anhydride, phthalic acid, isophthalic acid, terephthalic acid, methyl esters of phthalic, isophthalic, or terephthalic acid, dimethyl terephthalate, polyethylene terephthalate, trimellitic anhydride, pyromellitic dianhydride, maleic anhydride, and mixtures thereof;

(b) from about 20 to about 80 mole percent of at least one low molecular weight aliphatic diol of the formula

HO—R$_1$—OH wherein R$_1$ is a divalent radical selected from the group consisting of
  (i) alkylene radicals each containing from 2 through 12 carbon atoms;
  (ii) radicals of the formula —[CH$_2$—R$_2$—CH$_2$]— wherein R$_2$ is a radical selected from the group consisting of

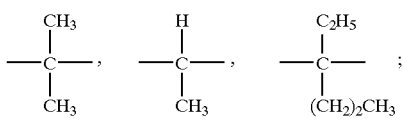

(iii) radicals of the formula

—[(R$_3$O)$_n$—R$_3$]— wherein R$_3$ is an alkylene radical containing from 2–4 carbon atoms and n is an integer from 1 through 10; and mixtures thereof;

(c) from about 0.1 to about 20 mole percent of a higher functional polyol selected from the group consisting of alkoxylated glycerine, sucrose, alkoxylated sucrose, methyl glucoside, alkoxylated methyl glucoside, glucose, alkoxylated glucose, fructose, alkoxylated fructose, alkoxylated sorbitol, lactose, alkoxylated lactose, and mixtures thereof;

wherein (a), (b), and (c) are interesterified to form an intermediate polyester polyol, which is further esterified with (d) from about 0.1 to about 20 mole percent of at least one hydrophobic material characterized by
  (i) having an equivalent weight of about 130–1000;
  (ii) containing from about 8 to 60 carbon atoms; and
  (iii) containing at least one and not more than four radicals per molecule, which are selected from the group consisting of carboxyl, hydroxyl, and mixtures thereof.

16. A process according to claim 15, wherein inter-esterification occurs in the presence of an esterification catalyst.

* * * * *